UNITED STATES PATENT OFFICE.

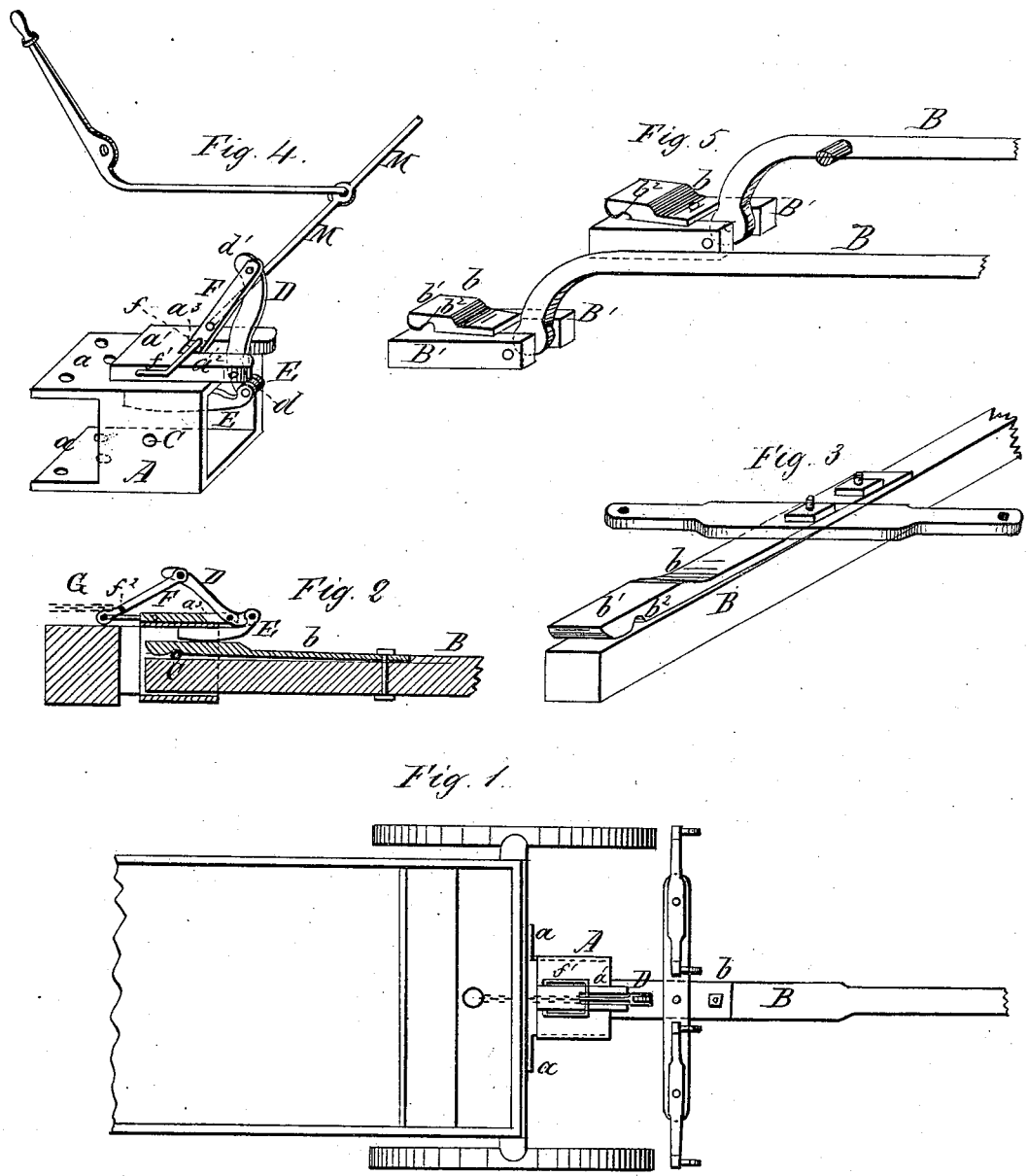

JOSEPH H. VOSS, OF CINCINNATI, OHIO.

IMPROVEMENT IN HORSE-DETACHERS.

Specification forming part of Letters Patent No. 207,574, dated August 27, 1878; application filed August 8, 1878.

*To all whom it may concern:*

Be it known that I, JOSEPH HERMANN VOSS, of the city of Cincinnati, in the county of Hamilton and State of Ohio, have invented new and useful Improvements in Horse-Detaching Devices, of which the following is a full, clear, and exact description:

My invention relates to improvements in devices for readily detaching the tongue, shaft, or shafts of a vehicle should the horse take fright and become unmanageable; and to that effect the invention consists in the combination, with the axle of a vehicle, of a coupling-box or suitable frame provided with a locking bolt or pin, arranged within the coupling-box, and a locking-lever or shoe adapted to lock the tongue or shaft to the bolt within the coupling-box, and suitable means for disengaging the shoe or locking-lever from the tongue, so that the horse or horses may withdraw said tongue or shaft from the coupling-box and vehicle.

The invention further consists in the application of a locking and tilting link so arranged with relation to the shoe or locking-lever that when said shoe is locked to the tongue the power applied by the draft-animal to said tongue will also be exerted upon the locking-link to lock the shoe firmly to the tongue or shaft.

The invention further consists in the peculiar arrangement of said locking-link, whereby it may be readily tilted by the driver from his seat, either by means of a flexible connection therewith, or by means of a hand or foot lever, notwithstanding the power exerted upon said link by the draft-animal pulling upon the tongue.

The invention further consists in providing the tongue or shaft with a notched spring-lever adapted to engage with the coupling-bolt within the coupling-box; and, lastly, the invention consists in certain details of construction and slight modifications in the arrangement of the device, as fully described hereinafter, and shown in the accompanying drawings, in which—

Figure 1 represents a plan view of so much of a vehicle as is necessary to illustrate my invention. Fig. 2 is a vertical section of the axle of a vehicle, the coupling-box, and tongue, showing the shoe released. Fig. 3 is a perspective view of part of a tongue, showing the spring locking-lever. Fig. 4 is a similar view of a coupling-box, its locking and releasing mechanism adapted for double-shaft vehicles. Fig. 5 is a perspective view of a pair of shafts hinged to sectional spring-blocks; and Fig. 6 is a perspective view of a slight modification in the construction of the coupling-box.

Similar letters of reference are employed in the above-described figures of the drawings to indicate corresponding parts wherever such may occur.

A represents a coupling-box of any desired construction, provided with projections or ears $a$, by means of which the box is connected with the fore axle of the vehicle. C represents a coupling-bolt passing through the box A at or near its vertical center. Upon the upper face of the box is secured a bearing-plate, $a^1$, forked at its forward end, the fork forming a slot or recess, $a^2$, extending back some distance, the rear face of this slot or recess being inclined forward, as shown at $a^3$, for a purpose hereinafter explained.

To the outer end of the fork of the plate $a^1$ is pivoted a curved tilting lever, D, to the lower short arm, $d$, of which is pivoted a locking-lever or shoe, E, the under face of which is of a slightly curvilinear form. To the upper long arm, $d'$, of the lever D is pivoted a connecting locking-link, F, the lower end, $f$, of which is pivoted upon an angular pin or bail, $f^1$, which latter is pivoted upon the bearing-plate $a^1$ at or near the rear end of the latter.

G represents a chain or other flexible connection, one end of which is attached to the locking-link F at or near its lower end, as shown by $f^2$, while the other end may be arranged to pass either through the front or bottom of the vehicle, and placed within reach of the driver; or this end may be connected with the horizontal short arm of a bell-crank lever, the vertical arm of which may be used as a hand or foot lever, and arranged in any preferred manner within the vehicle in reach of the driver.

By means of this connection the locking-link F is released from the slot in the bearing-plate $a^1$, the lever D tilted backward, and the shoe E withdrawn from the spring-bar of tongue. To facilitate the release of the locking-link F from its abutment $a^3$, I incline the latter forward, which not only facilitates the releasing of the link F, but also insures a firmer hold for the latter than would be the case were the face of the slot vertical. In practice, I give the lower extremity of the link F such an angle as to correspond exactly, or nearly so, with the angle of the abutment $a^3$.

B represents the tongue or shaft, or shafts, provided with a spring-lever, $b$, the forward end of which is bolted to the tongue, while its rear or free end forms a re-enforce or block, $b^1$, provided on its under face with a semicircular notch, $b^2$, to engage the coupling-bolt C. To facilitate the withdrawal of the spring-lever from the bolt or pin C, the semicircular notch $b^2$ is slightly beveled off at its rear edge, as shown; and, if desired, the tongue B may also be provided with a similar notch, though I have found that this may be dispensed with, as the hold of the spring-block upon the coupling-pin C is sufficient for almost every description of vehicles.

From what has been said above, it will be seen that when the lever D is tilted backward by means of the chain or hand or foot lever and its connections, through the action of the locking-link F, the tongue B may be readily inserted into the coupling-box A, so that its under face will bear upon the bottom plate of said box, while its upper face will lie under the coupling-pin C, and the spring-block above the pin, the latter lying in the notch $b^2$ of said block. If the lever D is now tilted forward, the shoe E will move backward into the box A, and will be wedged tightly upon the spring-block and lever $b$, locking the tongue and bolt C together. The forward movement of the lever D will at the same time impart a similar movement to the link F and bail $f^1$, and said link, being guided by the bail, will drop into the notch or slot and abut against the inclined face $a^3$ thereof. If power is now exerted in a forward direction upon the tongue, a similar power is also exerted upon the shoe E, tending to withdraw the latter from the box. This power of the shoe is, however, transferred to the lever D in a reverse or backward direction, and through said lever to the locking-link F, which latter, abutting against the face $a^3$ of the slot, cannot yield, except when purposely removed, so that the power which tends to withdraw the tongue from the coupling-box is employed to lock it therein.

The bail $f^1$ not only serves to guide the link properly to its place into the notch or slot, or from the latter, but also secures said link against accidental displacement from the slot from any cause, serving as an abutment against the backward motion of said link, the relation between bail $f^1$ and link F being the same as that between link F and shoe E and the tongue.

In Figs. 4 and 5 I have shown the device when applied to double-shaft vehicles, and in order to permit of said shafts being raised and lowered, as is the case usually, I hinge them to the spring-blocks B'. It will be readily understood that two coupling-boxes, one for each shaft, have to be used, and both links F are connected together by a bar, M, which is in turn connected to a cord or chain, or a bell-crank lever and hand or foot lever, as shown. By this arrangement and construction of devices these may be applied to any description of vehicle without necessitating any alteration of its relative parts, with the exception of removing the connections between the tongue or shaft or shafts with the fore axle, and substituting therefor the coupling box or boxes and the spring-lever or hinged spring-blocks.

In Fig. 6 I have shown a slight modification in the construction of the coupling-box.

It will also be seen that the coupling-box is adapted for any desired ornamentation, and from what has been said above I do not wish to limit myself to any particular form thereof, the chief features being the top and bottom plates, and means for securing them to the axle of a vehicle, combined with means for securing in position the locking or coupling bolt or pin.

Having now described my invention, what I claim, and desire to secure by Letters Patent, is—

1. In a horse-detaching device, the combination, with the axle of a vehicle and the tongue or shaft provided with a spring-bar, of a coupling-pin adapted to engage said spring-bar, a locking-lever or shoe arranged to lock the tongue and spring-bar to the coupling-pin within a coupling-box, and suitable mechanism adapted for releasing said shoe from the tongue by the driver in his seat, substantially as described, for the purpose specified.

2. In a horse-detaching device, the combination, with the tongue or shaft provided with a notched spring-bar, and the axle of a vehicle, of a coupling-bolt within a coupling-box, adapted for engagement with said tongue and spring-bar, a locking-lever or shoe arranged to hold the tongue and spring-bar in engagement with the coupling-bolt, a pivoted tilting lever connected with said locking-shoe, a locking-link connected with the tilting lever and engaging with the coupling-box, and means for disengaging said link and tilting the tilting lever to release the locking-shoe, substantially as described, for the purpose specified.

3. The combination, with the axle of a vehicle, and a coupling-box provided with a coupling-bolt, C, a forked bearing-plate, $a^1$, forming a slot having its rear face inclined, and means to connect said coupling-box with the axle, of a locking-shoe, E, lever D, link F, and connection G, all arranged to operate substantially as described, for the purpose specified.

4. The combination, with the bearing-plate $a^1$, the inclined abutment $a^3$, and the link F, of the bail $f^1$, substantially as described, for the purpose specified.

5. The combination, with the shaft or tongue, of the hinged blocks B′, provided with the notched spring-levers $b$, substantially as described, for the purpose specified.

6. The combination, with the axle of a vehicle, a pair of shafts and the hinged blocks B′, and spring-bars $b$, of the coupling-boxes A, coupling-bolts C, shoes E, levers D, links F, and suitable means to disengage said shoes simultaneously from the shafts, substantially as described, for the purpose specified.

In witness that I claim the foregoing I have hereunto set my hand this 9th day of August, 1878.

JOSEPH H. VOSS.

Witnesses:
  HENRY ORTH,
  SAM L. MATTINGLY.